United States Patent
Matsen et al.

[19]

[11] Patent Number: 6,040,563
[45] Date of Patent: Mar. 21, 2000

[54] BONDED ASSEMBLIES

[75] Inventors: Marc R. Matsen, Seattle; Douglas A. McCarville, Auburn, both of Wash.

[73] Assignee: The Boeing Company, Seattle, Wash.

[21] Appl. No.: 08/995,387

[22] Filed: Dec. 22, 1997

Related U.S. Application Data

[60] Division of application No. 08/468,116, Jun. 6, 1995, Pat. No. 5,793,024, which is a continuation-in-part of application No. 08/169,655, Dec. 16, 1993, Pat. No. 5,530,227, which is a continuation-in-part of application No. 07/777,739, Oct. 15, 1991, Pat. No. 5,410,132, which is a continuation-in-part of application No. 08/092,050, Jul. 15, 1993, Pat. No. 5,410,133, which is a division of application No. 07/681,004, Apr. 5, 1991, Pat. No. 5,229,562, which is a continuation-in-part of application No. 08/151,433, Nov. 12, 1993, Pat. No. 5,420,400.

[51] Int. Cl.[7] ....................................... H05B 6/10
[52] U.S. Cl. ........................... 219/633; 219/645; 219/672
[58] Field of Search ..................................... 219/602, 604, 219/608, 609, 615, 645–647, 650, 651, 659, 633–635, 672–677; 228/157, 173.2, 56.1; 428/593, 633, 570

[56] References Cited

U.S. PATENT DOCUMENTS

| | | |
|---|---|---|
| 2,241,312 | 5/1941 | Luty . |
| 2,273,423 | 2/1942 | Somes . |
| 2,372,920 | 4/1945 | Blessing . |
| 2,378,801 | 6/1945 | Sidell et al. . |
| 2,379,829 | 3/1945 | Pedlow et al. . |
| 2,423,922 | 7/1947 | Arndt, Jr. . |
| 2,589,777 | 3/1952 | Collins . |
| 2,715,598 | 8/1955 | Rees et al. . |
| 2,761,941 | 9/1956 | Ardichvili . |
| 2,841,678 | 7/1958 | Thorson . |
| 2,898,435 | 8/1959 | Crafts . |
| 2,984,732 | 5/1961 | Herbert . |
| 3,037,105 | 5/1962 | Kohler . |
| 3,061,503 | 10/1962 | Gould et al. . |
| 3,101,403 | 8/1963 | Lewis et al. . |
| 3,124,672 | 3/1964 | Sommer et al. . |
| 3,127,674 | 4/1964 | Kohler . |
| 3,129,459 | 4/1964 | Kullgren et al. . |

(List continued on next page.)

FOREIGN PATENT DOCUMENTS

| | | |
|---|---|---|
| 452317 | 10/1943 | Belgium . |
| 0 314548 | 10/1993 | European Pat. Off. . |
| 0461 979 | 4/1994 | European Pat. Off. . |
| 54-25542 | 2/1979 | United Kingdom . |
| WO 93/19926 | 10/1993 | WIPO . |
| WO 94/19173 | 9/1994 | WIPO . |

OTHER PUBLICATIONS

J. Giachino, Welding Skills and Practices, Am. Tech. Soc., Chicago, IL (1960, 1965, 1967, 1971, 1976) 393–401.

Jones, "Mechanics of Composite Materials," McGraw–Hill (1975) pp. 4–5.

Smith, et al., "Developments in Titanium Metal Matrix Composites," Journal of Metals, Mar., 1984, pp. 19–26.

Quarterly Government Report for Sep., 1992 through Nov. 1992.

(List continued on next page.)

Primary Examiner—Tu Ba Hoang
Attorney, Agent, or Firm—John C. Hammar

[57] ABSTRACT

The processing time and energy efficiency of metal or composite bonding operations is improved by heating the lay-up preform of the structure in an induction heating press where energy goes primarily to heating the workpieces rather than to heating the tooling or being lost to the environment. The bonding process is especially beneficial for joining thermoplastic composites, but it also can be used with metals or thermosets. Preferential heating at the bondline is achieved by using shims to define the bondline and to define bead regions that have relief from contact with the susceptor envelope because of the thickness of the shims in the bondline regions.

9 Claims, 5 Drawing Sheets

U.S. PATENT DOCUMENTS

| | | |
|---|---|---|
| 3,183,460 | 5/1965 | Bennon . |
| 3,288,979 | 11/1966 | Mills et al. . |
| 3,340,101 | 9/1967 | Fields, Jr. et al. . |
| 3,365,184 | 1/1968 | Willens . |
| 3,395,261 | 7/1968 | Leatherman et al. . |
| 3,395,993 | 8/1968 | Bristow . |
| 3,427,421 | 2/1969 | Matheson et al. . |
| 3,431,379 | 3/1969 | Yrene . |
| 3,444,275 | 5/1969 | Willett . |
| 3,450,856 | 6/1969 | Buck et al. . |
| 3,466,726 | 9/1969 | Savolainen . |
| 3,492,453 | 1/1970 | Hurst . |
| 3,507,735 | 4/1970 | Chisholm . |
| 3,529,458 | 9/1970 | Butler et al. . |
| 3,547,751 | 12/1970 | Morgan . |
| 3,574,031 | 4/1971 | Heller, Jr. et al. . |
| 3,595,060 | 7/1971 | Hundy . |
| 3,605,477 | 9/1971 | Carlson . |
| 3,615,277 | 10/1971 | Kreider et al. . |
| 3,639,974 | 2/1972 | Finnegan . |
| 3,845,268 | 10/1974 | Sindt . |
| 3,864,186 | 2/1975 | Balla . |
| 3,890,819 | 6/1975 | DeLuca . |
| 3,895,436 | 7/1975 | Summers et al. . |
| 3,900,150 | 8/1975 | Delgrosso et al. . |
| 3,919,764 | 11/1975 | Berghezan . |
| 3,920,175 | 11/1975 | Hamilton et al. . |
| 3,924,793 | 12/1975 | Summers et al. . |
| 3,927,817 | 12/1975 | Hamilton et al. . |
| 3,934,441 | 1/1976 | Hamilton et al. . |
| 3,941,643 | 3/1976 | Balla . |
| 3,946,349 | 3/1976 | Haldeman, III . |
| 3,974,673 | 8/1976 | Fosness et al. . |
| 3,981,427 | 9/1976 | Brookes . |
| 3,996,019 | 12/1976 | Cogan . |
| 3,996,402 | 12/1976 | Sindt . |
| 4,005,302 | 1/1977 | Graf et al. . |
| 4,029,837 | 6/1977 | Leatherman . |
| 4,029,838 | 6/1977 | Chamis et al. . |
| 4,029,929 | 6/1977 | Austin . |
| 4,039,794 | 8/1977 | Kasper . |
| 4,091,254 | 5/1978 | Struve . |
| 4,111,024 | 9/1978 | Dahlman et al. . |
| 4,117,970 | 10/1978 | Hamilton et al. . |
| 4,120,712 | 10/1978 | Sindt . |
| 4,141,484 | 2/1979 | Hamilton et al. . |
| 4,145,903 | 3/1979 | Leach et al. . |
| 4,180,717 | 12/1979 | Lenk et al. . |
| 4,188,811 | 2/1980 | Brimm . |
| 4,210,477 | 7/1980 | Gillespie et al. . |
| 4,217,397 | 8/1980 | Hayase et al. . |
| 4,233,829 | 11/1980 | Hamilton et al. . |
| 4,233,831 | 11/1980 | Hamilton et al. . |
| 4,263,087 | 4/1981 | Tanabe et al. . |
| 4,263,375 | 4/1981 | Elrod . |
| 4,269,053 | 5/1981 | Agrawal et al. . |
| 4,288,673 | 9/1981 | Ishibashi . |
| 4,304,821 | 12/1981 | Hayase . |
| 4,304,975 | 12/1981 | Lenk et al. . |
| 4,305,449 | 12/1981 | Loszewski et al. . |
| 4,306,436 | 12/1981 | Schulz et al. . |
| 4,307,276 | 12/1981 | Kurata et al. . |
| 4,313,777 | 2/1982 | Buckley et al. . |
| 4,331,284 | 5/1982 | Schultz et al. . |
| 4,340,650 | 7/1982 | Pattanaik et al. . |
| 4,343,982 | 8/1982 | Schwartz et al. . |
| 4,351,470 | 9/1982 | Swadling et al. . |
| 4,352,280 | 10/1982 | Ghosh . |
| 4,354,369 | 10/1982 | Hamilton . |
| 4,355,222 | 10/1982 | Geithman et al. . |
| 4,361,262 | 11/1982 | Israeli . |
| 4,382,113 | 5/1983 | Schwartz et al. . |
| 4,398,659 | 8/1983 | Richter . |
| 4,416,713 | 11/1983 | Brooks . |
| 4,421,588 | 12/1983 | Davies . |
| 4,426,032 | 1/1984 | Leodolter . |
| 4,426,033 | 1/1984 | Mizuhara . |
| 4,445,951 | 5/1984 | Lind et al. . |
| 4,447,690 | 5/1984 | Grever . |
| 4,454,402 | 6/1984 | Sander et al. . |
| 4,468,549 | 8/1984 | Arnosky . |
| 4,474,044 | 10/1984 | Leistner et al. . |
| 4,489,123 | 12/1984 | Schijve et al. . |
| 4,499,156 | 2/1985 | Smith et al. . |
| 4,521,656 | 6/1985 | Buckley et al. . |
| 4,542,272 | 9/1985 | Hubbard . |
| 4,563,145 | 1/1986 | De Meij . |
| 4,584,860 | 4/1986 | Leonard . |
| 4,602,731 | 7/1986 | Dokus . |
| 4,603,089 | 7/1986 | Bampton . |
| 4,603,808 | 8/1986 | Stacher . |
| 4,610,934 | 9/1986 | Boecker et al. . |
| 4,621,761 | 11/1986 | Hammond et al. . |
| 4,622,445 | 11/1986 | Matsen . |
| 4,630,767 | 12/1986 | Mizuhara . |
| 4,649,249 | 3/1987 | Odor . |
| 4,653,396 | 3/1987 | Wennerberg . |
| 4,657,717 | 4/1987 | Cattanach et al. . |
| 4,671,470 | 6/1987 | Jonas . |
| 4,673,450 | 6/1987 | Burke . |
| 4,698,271 | 10/1987 | Moorhead . |
| 4,699,849 | 10/1987 | Das . |
| 4,713,953 | 12/1987 | Yavari . |
| 4,745,114 | 5/1988 | Kitaide et al. . |
| 4,754,155 | 6/1988 | Sommer et al. . |
| 4,768,433 | 9/1988 | Boissevain . |
| 4,791,260 | 12/1988 | Waldman . |
| 4,797,155 | 1/1989 | Das . |
| 4,822,972 | 4/1989 | Sugioka et al. . |
| 4,888,973 | 12/1989 | Comley . |
| 4,889,276 | 12/1989 | Cadwell et al. . |
| 4,897,518 | 1/1990 | Mucha et al. . |
| 4,901,552 | 2/1990 | Ginty et al. . |
| 4,904,972 | 2/1990 | Mori et al. . |
| 4,913,910 | 4/1990 | McCarville et al. . |
| 4,919,859 | 4/1990 | Ilmarinen et al. . |
| 4,934,581 | 6/1990 | Ibe et al. . |
| 4,947,464 | 8/1990 | Mori et al. . |
| 4,955,803 | 9/1990 | Miller et al. . |
| 4,978,825 | 12/1990 | Schmidt et al. . |
| 4,984,348 | 1/1991 | Cadwell . |
| 4,988,037 | 1/1991 | Cadwell . |
| 5,001,319 | 3/1991 | Holmstrom . |
| 5,024,369 | 6/1991 | Froes et al. . |
| 5,047,605 | 9/1991 | Ogden . |
| 5,074,019 | 12/1991 | Link . |
| 5,079,817 | 1/1992 | Anstotz et al. . |
| 5,101,086 | 3/1992 | Dion et al. . |
| 5,118,026 | 6/1992 | Stacher . |
| 5,199,791 | 4/1993 | Kasanami et al. . |
| 5,229,562 | 7/1993 | Burnett et al. ........................... 219/604 |
| 5,240,542 | 8/1993 | Miller et al. . |
| 5,248,864 | 9/1993 | Kodokian . |
| 5,250,776 | 10/1993 | Pfaffmann . |
| 5,283,409 | 2/1994 | Brendel et al. . |
| 5,313,034 | 5/1994 | Grimm et al. . |
| 5,313,037 | 5/1994 | Hansen et al. . |
| 5,338,497 | 8/1994 | Murray et al. . |

| | | | |
|---|---|---|---|
| 5,410,132 | 4/1995 | Gregg et al. | 219/604 |
| 5,410,133 | 4/1995 | Matsen et al. | 219/645 |
| 5,419,170 | 5/1995 | Sanders et al. | 72/60 |
| 5,420,400 | 5/1995 | Matsen et al. | 219/615 |
| 5,530,227 | 6/1996 | Matsen et al. | 219/633 |
| 5,599,472 | 2/1997 | Brown et al. | 219/634 |
| 5,705,794 | 1/1998 | Gillespie et al. | 219/616 |
| 5,728,309 | 3/1998 | Matsen et al. | 219/633 |
| 5,793,024 | 8/1998 | Matsen et al. | 219/633 |

OTHER PUBLICATIONS

Border, et al., "Introduction Heated Joining of Thermoplastic Composites Without Metal Susceptors," $34^{th}$ International SAMPE Symposium, May 8–11, 1989, pp. 2569–2578.

Sumida, et al., "Pan Based High Modulus Graphitized Carbon Fiber Torayca M60J", $34^{th}$ International SAMPE Symposium, May 8–11, 1989, pp. 2579–2589.

BONDED ASSEMBLIES

REFERENCE TO RELATED APPLICATIONS

The present application is a divisional application based upon U.S. patent application Ser. No. 08/468,116, filed Jun. 6, 1995, now U.S. Pat. No. 5,793,024 which was a continuation-in-part application based upon U.S. patent application Ser. No. 08/169,655, filed Dec. 16, 1993, now U.S. Pat. No. 5,530,227 which was a continuation-in-part application of U.S. patent application Ser. No. 07/777,739, filed Oct. 15, 1991, now U.S. Pat. No. 5,410,132. The present application also is a continuation-in-part application based upon U.S. patent application Ser. No. 08/092,050, filed Jul. 15, 1993, now U.S. Pat. No. 5,410,133 which is a divisional of U.S. patent application Ser. No. 07/681,004, filed Apr. 5, 1991, now U.S. Pat. No. 5,229,562. Finally, the present application is also a continuation-in-part application based upon U.S. patent application Ser. No. 08/151,433, filed Nov. 12, 1993, now U.S. Pat. No. 5,420,400. We incorporate these applications and patents by reference.

TECHNICAL FIELD

The present invention relates to bonded assemblies made by bonding metal or composite structures, including both thermosets and thermoplastics, using induction heating to heat the workpieces efficiently and rapidly and, thereby, to reduce the bonding operations time and cost.

BACKGROUND ART

Fiber-reinforced organic resin matrix composites have a high strength-to-weight ratio or high stiffness-to-weight ratio and desirable fatigue characteristics that make them increasingly popular as a replacement for metal in aerospace applications where weight, strength, or fatigue is critical. Composites today, however, are expensive. There is a need for improved manufacturing processes to reduce touch labor and the forming time.

Prepregs combine continuous, woven, or chopped fibers with an uncured matrix resin, and usually are fiber sheets with a thin film of the matrix. Sheets of prepreg generally are placed (laid-up) directly upon a tool or die having a forming surface contoured to the desired shape of the completed part or are laid-up in a flat sheet which is then draped and formed over the tool or die to the contour of the tool. Lay up can be by hand or with specialized tow or tape placement equipment. Then the resin in the prepreg lay up is consolidated (i.e., cured) in a vacuum bag process in an autoclave (i.e., a pressure oven) to complete the part.

The tools or dies for metal or composite processing typically are formed to close dimensional tolerances. They are massive, must be heated along with the workpiece, and must be cooled prior to removing the completed part. The delay caused to heat and to cool the mass of the tools adds substantially to the overall time necessary to fabricate each part. These delays are especially significant when the manufacturing run is low rate where the dies need to be changed after producing only a few parts of each kind.

In hot press forming, the prepreg is laid-up, bagged (if necessary), and placed between matched metal tools that include forming surfaces that define the internal external, or both mold lines of the completed part. The tools and composite preform are placed within a press and then the tools, press, and preform are heated. By "preform" we mean the prepreg lay up.

The tooling in autoclave or hot press fabrication is a significant heat sink that consumes substantial energy. Furthermore, the tooling takes significant time to heat the composite material to its consolidation temperature and, after curing the composite, to cool to a temperature at which it is safe to remove the finished composite part.

As described in U.S. Pat. No. 4,657,717, a flat, composite prepreg panel was sandwiched between two metal sheets made from a superplastically formable alloy, and formed against a die having a surface precisely contoured to the final shape of the part.

Attempts have been made to reduce composite fabrication times by actively cooling the tools after forming the composite part. These attempts have shortened the time necessary to produce a composite part, but the time for and cost of heating and cooling remain significant contributors to overall fabrication costs. Designing and making tools with active cooling increases their cost.

Boeing described a process for organic matrix forming and consolidation using induction heating in U.S. patent application Ser. No. 08/169,655. There, prepregs were laid up in a flat sheet and were sandwiched between aluminum susceptor facesheets. To ensure an inert atmosphere around the composite during curing and to permit withdrawing volatiles and outgassing from around the composite during the consolidation, we welded the facesheets around their periphery. Such welding unduly impacts the preparation time and the cost for part fabrication. It also ruined the facesheets (i.e., prohibited their reuse). The present invention is a technique that readily and reliably seals the facesheets without the need for welding and permits reuse of the facesheets in certain circumstances. Our "bag-and-seal" technique applies to both resin composite and metal processing, especially in our induction heating workcell.

For purposes of this description, we use "consolidation" to mean pressure compacting and curing of an organic matrix resin through thermally activated chemical reactions to produce a stable composite. By "forming," we mean shaping the composite or metal and retort in its plastic state. "Forming" may entail superplastic forming, drawing, or some other shaping operation, as those skilled in the art will understand.

Airplanes are commonly made from metal or composite with prefabricated parts assembled and fastened or riveted together. The labor cost for fastening is a significant cost element and the fasteners add weight that limits overall performance and capability or adversely impacts operational costs. For military aircraft, weight translates to payload/range which is critical with modern technology with a small advantage can mean the difference between success and failure. For commercial aircraft, while weight does not translate to survivability, it is still a significant factor because the capital cost plus the operating cost are the key elements of the airlines expense. Technologies to reduce cost and weight, accordingly, are dear in the aircraft industry. The present invention is a bonding operation using Boeing's induction heating workcell which promises significant cost and weight savings for the manufacture of aerospace parts and assemblies.

While graphite or boron fibers can be heated directly by induction, most organic matrix composites require a susceptor in or adjacent to the composite material preform to achieve the necessary heating for consolidation or forming. A retort of sealed susceptor sheets is also desirable for metal workpieces to control the atmosphere around the workpiece and to achieve uniform heating. The susceptor is heated inductively and transfers its heat principally through conduction to the preform or workpiece that is sealed within the susceptor retort. While the metals in the workpiece may themselves be susceptible to induction heating, the metal workpiece needs to be shielded in an inert atmosphere during high temperature processing to avoid oxidation of the metal, so we usually enclose the workpiece (one or more metal sheets) in a metal retort when using our ceramic tooling induction heating press. Enclosed in the metal retort, the workpiece does not experience the oscillating magnetic field which instead is absorbed in the retort sheets. Heating is by conduction from the retort to the workpiece.

Induction focuses heating on the retort (and workpiece) and eliminates wasteful, inefficient heat sinks. Because the ceramic tools in our induction heating workcell do not heat to as high a temperature as the metal tooling of conventional prior art presses, problems caused by different coefficients of thermal expansion between the tools and the workpiece are reduced. Furthermore, we are energy efficient because significantly higher percentages of our input energy goes to heating the workpiece than occurs with conventional presses. Our reduced thermal mass and ability to focus the heating energy permits us to change the operating temperature rapidly which improves the products we produce. Finally, our shop environment is not heated as significantly from the radiation of the large thermal mass of a conventional press.

In induction heating for consolidating and/or forming organic matrix composite materials, we place a thermoplastic organic matrix composite preform of PEEK or ULTEM, for example, adjacent a metal susceptor. These thermoplastics have a low concentration of volatile solvents and are easy to use. The susceptor facesheets of the retort are inductively heated to heat the preform. We apply consolidation and forming pressure to consolidate and, if applicable, to form the preform at its curing temperature. Generally, we enclose the preform between two susceptor sheets that are sealed to form a pressure zone. We call this assembly a "retort." We evacuate the pressure zone in the retort in a manner analogous to conventional vacuum bag processes for resin consolidation, or, for resins with low volatiles resins, like ULTEM, we can pressurize this zone to enhance consolidation. The retort is placed in an induction heating press on the forming surfaces of dies having the desired shape of the molded composite part. After the retort (and preform) are inductively heated to the desired elevated temperature, we apply differential pressure (while maintaining the vacuum in the pressure zone around the preform) across the retort which functions as a diaphragm in the press to form the preform against the die into the desired shape of the completed composite panel.

The retort often includes three susceptor sheets sealed around their periphery to define two pressure zones. The first pressure zone surrounds the composite panel/preform or metal workpiece and is evacuated and maintained under vacuum. The second pressure zone is pressurized (i.e., flooded with gas) at the appropriate time and rate to help form the composite panel or workpiece. The shared wall of the three layer sandwich that defines the two pressure zones acts as a diaphragm in this situation.

In preparing the retort, as described in U.S. patent application Ser. No. 08/341,779, we often use temporary seals to hold the sheets until the sheets are clamped into the press, and we prefer a "C" spring clamp. The clamp sandwiches the outer susceptor sheets of the retort and provides a compressive force to hold the retort together temporarily, pressing the sheets against an "O" ring gasket. Such a gasket seats between susceptor sheets in a machined or formed groove or crimp around the periphery of adjacent susceptors. For processing below about 600° F. (315° C.), the gasket is generally silicone rubber. Between about 600° F. (315° C.) and 1300° F. (705° C.), the gasket is copper; above about 1300° F. (705° C.), the gasket is stainless steel. The gasket and susceptor sheets abut and form a gas seal via the compressive force of the die set The "C" clamp permits handling of the retort in and out of the die set. The "C" clamp also provides a current path from the top sheet to the bottom sheet (when the gasket is rubber or stainless steel). The "C" clamp can be omitted when we use a copper gasket, but handling the susceptor sheets is more difficult. The "C" clamp jumper is only required for electrical continuity when the gasket is not an electrical conductor and, then, only on the edges of the retort transverse to the induction coils since the coils induce eddy currents in the susceptor that flow parallel to the coils. We can perform a wide range of manufacturing operations in our induction heating press. These operations have optimum operating temperatures ranging from about 350° F. (175° C.) to about 1950° F. (1068° C.). For each operation, we usually need to hold the temperature relatively constant for several minutes to several hours while we complete the operations. While we can achieve temperature control by controlling the input power fed to the induction coil, we have discovered a better and simpler way that capitalizes on the Curie temperature. By judicious selection of the metal or alloy in the retort's susceptor facesheets, we can avoid excessive heating irrespective of the input power. With improved control and improved temperature uniformity in the workpiece, we produce better products.

As described to some degree in U.S. Pat. No. 4,622,445 and in co-pending U.S. patent application Ser. No. 07/777, 739, we discovered an improvement for an SPF process coupling the use of ceramic dies with inductive heating. With our inductively heated SPF press or workcell, we can heat preferentially the sheet metal workpiece with induction heating without heating the platens or dies significantly and can use the ceramic dies as an insulator to hold the induced heat in the part. We can stop the heating at any time and can cool the part relatively quickly even before removing it from the die. We do not waste the energy otherwise required to heat the large thermal mass of the platens and dies. We do not force the press operators to work around the hot dies and platens. With our inductive heating workcell, we also save time and energy when changing dies to set up to manufacture different parts because the dies and platen are significantly cooler than those in a conventional SPF press. We shorten the operation to change dies by several hours. Therefore, the induction heating process is an agile work tool for rapid prototyping or low rate production with improved efficiency and versatility.

U.S. Pat. Nos. 3,920,175 and 3,927,817 describe typical combined cycles for SPF forming and diffusion bonding. Diffusion bonding is a notoriously difficult and temperamental process that has forced many SPF fabricators away from multisheet manufacturing or to "clean room" production facilities and other processing tricks to eliminate the possibility of oxidation in the bond. Oxides foul the integrity of the bond. In addition, diffusion bonds are plagued with microvoids which are difficult to detect nondestructively, but, if present, significantly diminish the structural performance of the joint. Diffusion bonding also is a time consuming process. The part typically must be held at elevated temperature and elevated pressure (about 400 psi) for several hours. For example, in U.S. Pat. No. 3,920,175, the diffusion bonding operation takes five hours at 1650° F. (900° C.), making the forming/bonding operation six hours.

In U.S. Pat. No. 3,927,817, diffusion bonding occurs prior to forming, still requires four to five hours, and forces a six hour bonding/forming cycle at 1650° F. (900° C.) for the entire period. Typically a hot press diffusion bonding process for common titanium alloys used in aerospace applications will require over eight hours at 2500 psi and 800° C. (1472° F.), about six hours at 400 psi and 900° C. (1650° F.), or about two hours at 250–300 psi and 950° C. (1742° F.). Producing this heat and pressure for this length of time is expensive.

The present invention is a timesaving process that promises higher quality parts at lower production costs with significant energy savings in shorter production times. The troubles of diffusion bonding are eliminated by replacing diffusion bonding with brazing so that a much more efficient manufacturing cycle is possible. Manufacturers have greater assurance in the integrity of the brazed bond. To achieve a satisfactory brazed bond quickly and reliably, we focus the heating on the part we are forming using an induction heater. We hold the part within insulating ceramic dies that are transparent to the time-varying magnetic field that our induction heater produces. We significantly reduce cycle time in manufacturing modem aerospace parts.

Our workcell can function with both metals and composites and has considerable versatility and agility with respect to the manufacturing operations performed and the operating temperature.

SUMMARY OF THE INVENTION

In a method of the present invention for bonding organic matrix composite materials, prefabricated resin composite parts (thermosets or thermoplastics) are assembled to define a bondline (for thermosets) or weld line (for thermoplastics). Along the bondline/weld line, we place an adhesive or a thermoplastic which we melt in the bonding operation to join the prefabricated composite parts together. We place this assembly of the prefabricated composite parts and adhesive/weldment within a metal susceptor retort that we seal in accordance with our earlier inventions. We might also use some or all uncured or partially cured parts. When we intend to heat the adhesive/weldment until it melts in the bonding regions and do not want to melt the prefabricated composite parts in regions remote from the bondline/weldline, we place susceptor shims on the assembly to relieve the composite parts from (i.e., lift off the surface of) the metal susceptor sheets in regions other than the bonding/weld line. We load the retort in the induction heating workcell, energize the coil to heat the susceptor, and, in turn the adhesive/weldment while pressing the assembly (at least in the regions of the bondline) to form the bond upon cooling, and de-energize the coil to cool the retort with whatever cooling profile we prefer.

Because of our capability with induction heating to rapidly heat and cool we significantly reduce the processing time over conventional autoclave bonding operations in fabricating thermoset honeycomb panels. While we can heat to 375° F. (190° C.) in about 15 min. with our workcell, an autoclave takes about 180 min.; twelve times as long. Therefore, we can shorten the bonding cycle time from as much as 300 min to about 90 min, a reduction of 70%. Time translates directly into cost. For thermoplastic bonding, the cycle time reduction is from about 240 min to 30 min (an 87% reduction).

The retort may include three susceptor sheets sealed around their periphery to define two pressure zones. The first pressure zone surrounds the composite panel/preform or metal workpiece and is evacuated and maintained under vacuum. The second pressure zone is pressurized (i.e., flooded with gas) to help form the composite panel or workpiece. The shared wall of the three layer sandwich acts as a diaphragm in this situation.

For metal bonding, the assembly is similar. Between the prefabricated metal parts, however, we use a braze alloy or an organic matrix resin adhesive. We heat the susceptor much hotter than with resin composite parts, if we are brazing, and usually apply a higher pressure, but we focus heating along the bondline with the appropriate placement of the shims. The shims conduct heat rapidly from the susceptor to the part in the location(s) of the bondline while the relief that the shims provide in other locations forces convection and radiation to be the primary heat transfer mechanism to such regions by using shims, we obtain higher pressure at the bondline than at locations remote from the shims without changing the die contour or configuration.

We can also glue metal parts together with a hot melt resin adhesive. In this case, we either heat the part directly with induction or we use a susceptor to heat the confined part or we use a bondline susceptor that is responsive to induction heating. We apply the adhesive to prepared surfaces and press the parts together with the dies or with diaphragm pressure from pressure zones in the encasing retort. We can bond virtually any metals this way rapidly using our relatively inexpensive, flexible (multifunctional) tooling.

DETAILED DESCRIPTION OF THE PREFERRED EMBODIMENT

1. The Induction Heating Process

Figure 1:
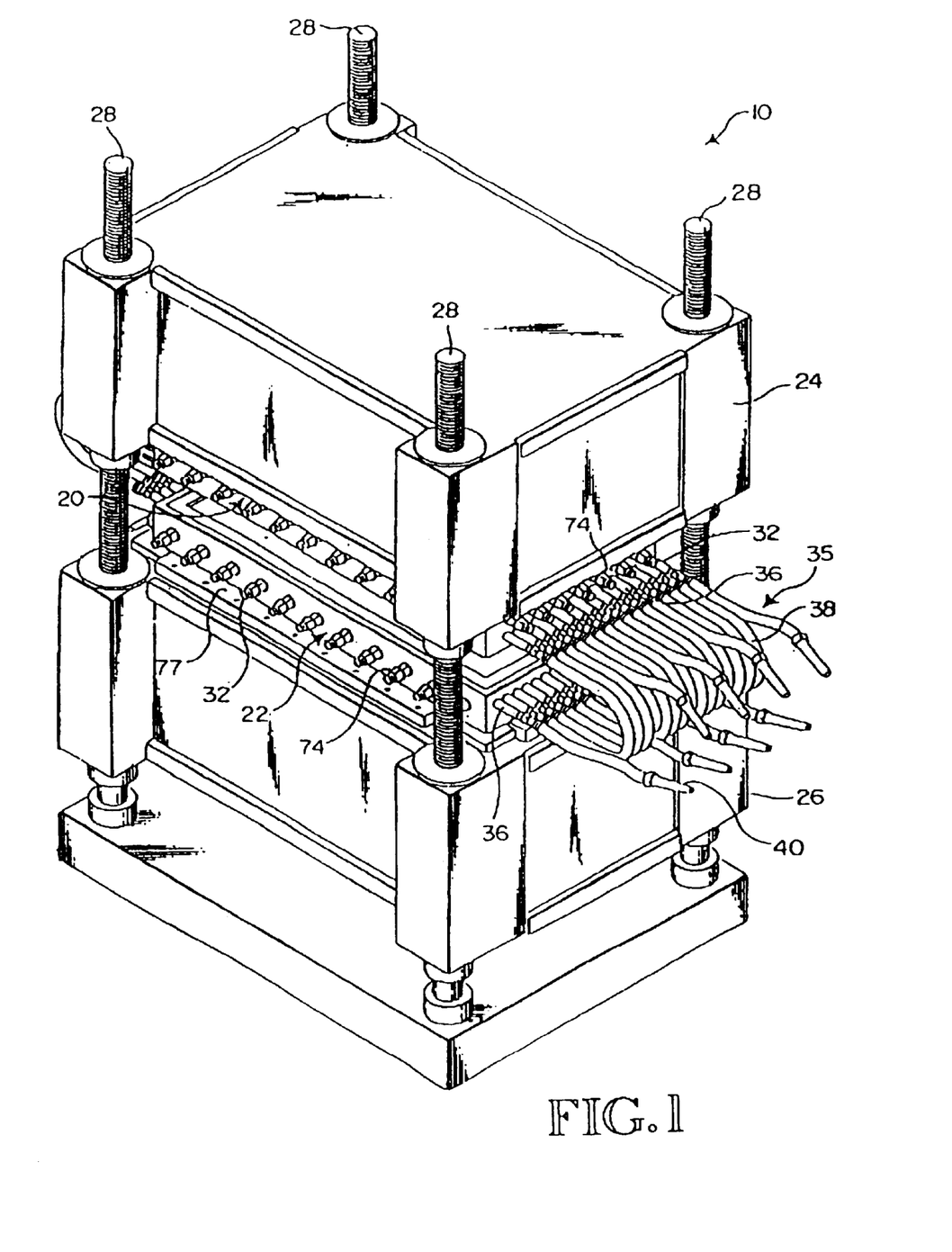
FIG. 1 is a perspective view of our induction heating workcell.

In FIG. 1, an induction heating workcell 10 includes tools or dies 20 and 22 mounted within an upper 24 and a lower 26 strongback. The strongbacks are each threaded onto four threaded column supports or jackscrews 28 or they float free on the columns and are fixed with nuts. We can turn the jackscrews to move one strongback relative to the other. The strongbacks 24 and 26 provide a rigid, flat backing surface for the upper and lower dies 20 and 22 to prevent the dies from bending and cracking during manufacturing operations. Preferably, the strongbacks hold the dies to a surface tolerance of ±0.003 inches per square foot of the forming surface. Such tolerances are desirable to achieve proper part tolerances. The strongbacks may be steel, aluminum, or any other material capable of handling the loads present during forming or consolidation, but we prefer materials that are non-magnetic to avoid any distortion to the magnetic field that our induction coils produce. In some circumstances, the dies may be strong enough themselves that strongbacks are unnecessary. The strongbacks transfer pressure input through the columns evenly to the dies.

The dies 20 and 22 are usually ceramic and are reinforced with a plurality of fiberglass rods 32 that are held with bolts 74 and that extend both longitudinally and transversely in a grid through each die. Each die usually is framed with phenolic reinforcement 72 as well to maintain a compressive load on the die. Each die may be attached to its strongback by any suitable fastening device such as bolting or clamping. In the preferred embodiment, both dies are mounted on support plates 76 which are held in place on the respective strongbacks through the use of clamping bars 77. The clamping bars 77 extend around the periphery of the support plates 76 and are bolted to the respective strongbacks through the use of fasteners (not shown).

The dies should not be susceptible to inductive heating so that heating is localized in the retort. We prefer a ceramic that has a low coefficient of thermal expansion, good thermal shock resistance, and relatively high compression strength, such as a castable fused silica ceramic.

We embed portions of an induction coil 35 in the dies. In the illustrated embodiment, we use four separate induction segments, but the number can vary. Each segment is formed from a straight tubing section 36 that extends along the length of each die and a flexible coil connector 38 that joins the straight tubing sections 36 in the upper die 20 to the corresponding straight tubing section in the lower die 22. Connectors 40 located at the ends of the induction coil 35 connect the induction coil 35 to an external power source or coil driver 50 and to a coolant source.

Cavities 42 and 44 in the respective dies can hold tool inserts 46 and 48. The upper tool insert 46 in some applications has a contoured forming surface 58 that has a shape corresponding to the desired shape of the outer mold line surface of the completed composite. The lower tool insert usually determines the inner mold line. The tool inserts also should not be susceptible to inductive heating, preferably being formed of a castable ceramic. In some cases, both the dies and the tool inserts can be made from a matrix resin rather than from a ceramic. Using a resin, however, limits use of the tooling to low temperature operations, such as forming or consolidating certain organic matrix composites. We prefer cast ceramic tooling which provides the greatest flexibility and versatility for the induction heating workcell. The forming surfaces can be an integral part of the dies.

Each die surrounds and supports the respective tool insert and holds the straight sections 36 of the induction coil in proper position in relationship to the tool insert 46 or 48. In the preferred embodiment, the interior 70 of the dies is formed of a castable phenolic or ceramic and the exterior sides from precast composite phenolic resin blocks 72. In some applications, we prefer to reinforce the phenolic or ceramic with chopped fibers or non-woven or woven reinforcing mats.

Figure 2:
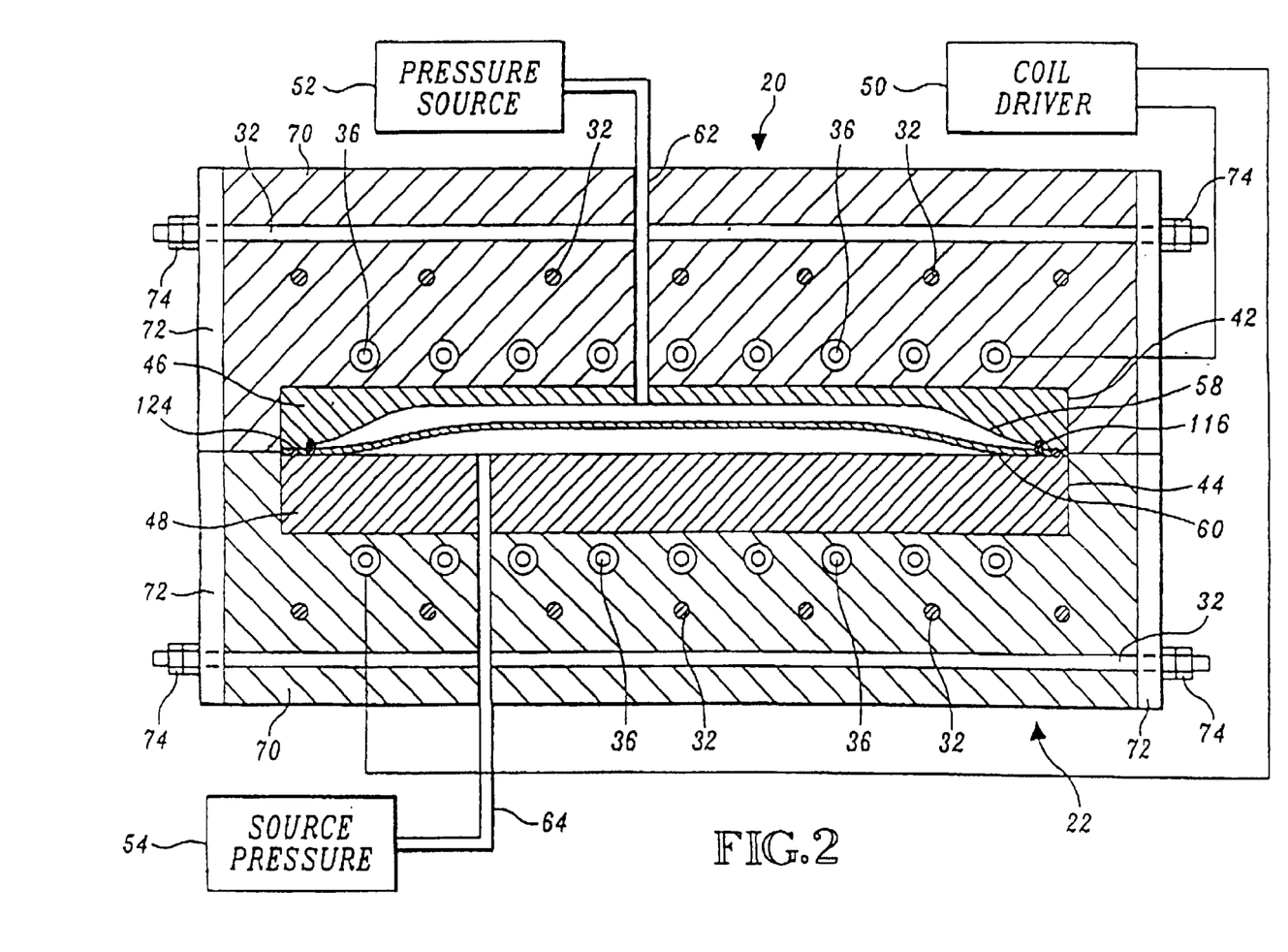
FIG. 2 is a schematic cross-sectional view of the apparatus of FIG. 1.
Figure 3:
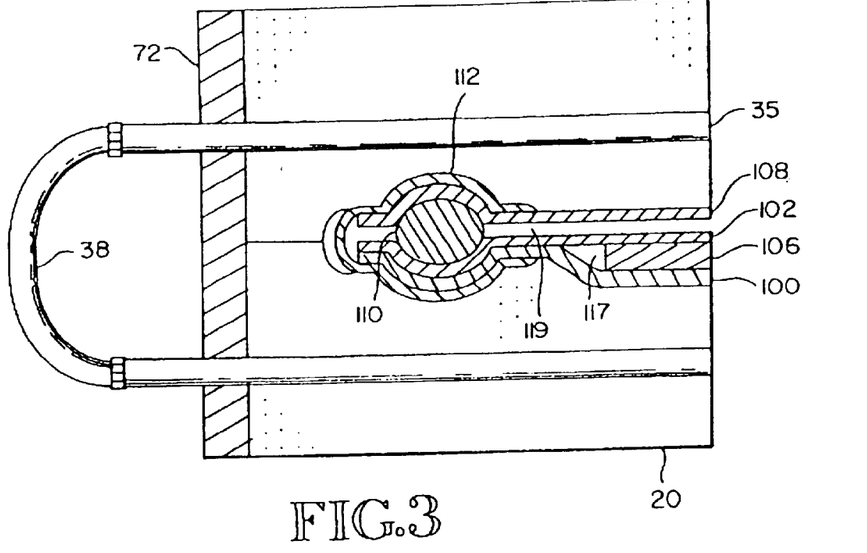
FIG. 3 is a schematic sectional view of our induction heating workcell showing a typical detail of the edge sealing for our susceptor retort.

FIG. 2 shows a retort 60 between the tool inserts 46 and 48. The retort 60 includes an organic matrix composite panel or metal workpiece sandwiched with susceptor facesheets. The retort is heated to the operating temperature by energizing the coil 35. In the case of a composite panel, when the panel reaches the bonding temperature where the adhesive melts or the theromplastic resin flows, we can apply gas pressure to the outer surfaces of the retort by pressure sources 52 and 54 to form the workpiece in regions remote from the bondline. Pressure source 52 applies pressure to the upper surface of the retort 60 through a conduit 62 that passes through the upper die 20 and upper tool insert 46, while pressure source 54 applies a pressure to the lower surface of the retort 60 through a conduit 64 that passes through the lower die 22 and lower tool insert 48. The pressure applied to the retort 60 is maintained until the retort has formed to the contour of the forming surface 58 and the matrix resin has consolidated. The pressure sources 52 and 54 generally apply a differential pressure to the retort 60.

Pin holes (not shown) in the tool inserts vent gas trapped between the retort 60 and the forming surface 58 as the retort deforms. Such pin holes can be coupled to a flow meter to monitor the progress of the deformation.

When the bonding is complete, the induction coil 35 is de-energized and the pressure relieved. The tool inserts and dies are separated. We remove the formed retort 60 from the press and recover the composite part from between the susceptor facesheets.

An alternating oscillating electrical current in the induction coil 35 produces a time varying magnetic field that heats the susceptor sheets of the retort via eddy current heating. The frequency at which the coil driver 50 drives the coils 35 depends upon the nature of the retort 60. We power the coil with up to about 400 kW at frequencies of between about 3–10 kHz. Current penetration of copper at 3 kHz is approximately 0.06 inches (1.5 mm), while penetration at 10 kHz is approximately 0.03 inches (0.75 mm).

The shape of the coil has a significant effect upon the magnetic field uniformity. Field uniformity usually is important because temperature uniformity induced in the retort is directly related to the uniformity of the magnetic field. Uniform heating insures that different portions of the workpiece will reach the operating temperature at approximately the same time. Solenoid type induction coils like those we illustrate provide a uniform magnetic field, and are preferred. Greater field uniformity is produced in a retort that is located symmetrically along the centerline of the surrounding coil. Those of ordinary skill can establish series/parallel induction coil combinations, variable turn spacing, and distances between the part and the induction coil by standard electrical calculations to achieve the desired heating from whatever coil configuration is used.

The tool inserts and dies are usually substantially thermally insulating and trap and contain heat within the retort. Since the dies and tool inserts are not inductively heated and act as insulators to maintain heat within the retort, the present invention requires far less energy to achieve the desired operating temperature than conventional autoclave or resistive hot press methods where the metal tooling is a massive heat sink.

Bonding operations using our workcell are faster than prior art operations because we do not heat the large thermal mass of either the dies or tool inserts. The retort is heated, the tool is not. Thus, the necessary processing temperature is achieved more rapidly. In addition, the highly conductive materials in the retort provide rapid heat transfer to the workpiece. When the driver 50 is de-energized, the dies and the retort cool rapidly to a temperature at which we can remove the retort from the workcell, saving time and energy over conventional systems. Coolant flowing through the coil tubes functions as an active heat exchanger to transfer heat out of the workpiece, retort, and dies. In addition, the thermal cycle is not as limited by the heating and cooling cycle of the equipment and tools so we can tailor the thermal cycle better to the process for which we are using the induction heating workcell.

2. Bonding Thermoplastic Resin Composites

Figure 4:
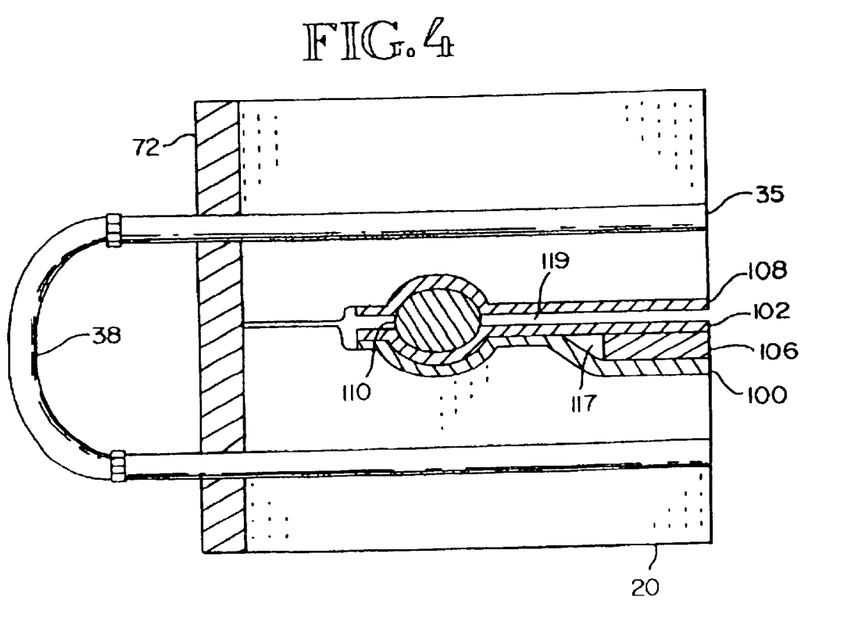
FIG. 4 is another schematic sectional view, similar to FIG. 3, showing a copper gasket which allows us to eliminate the "C" clamp used in FIG. 3.
Figure 5:
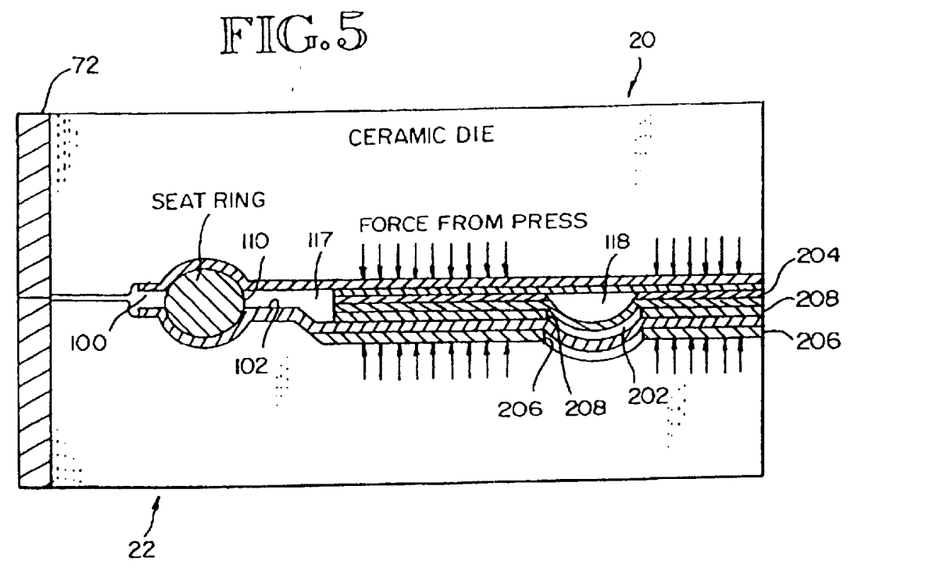
FIG. 5 is another schematic sectional view showing bonding of a beaded panel using our induction heating workcell.

In a bonding or bonding-and-forming process for organic (resin) matrix composites, a composite panel assembly is laid-up from individual prefabricated composite sheets. The composite panel assembly includes a thermoplastic sheet that functions as a bonding agent between the prefabricated parts. The assembly is placed between a first sheet 100 and second sheet 102 of a susceptor (usually aluminum, an aluminum alloy, or a "smart" susceptor) to form a retort. As shown in FIG. 4 & 5, the susceptor sheets are sealed around their periphery with a crimp and seal ring 110 formed into the susceptor sheets. A first pressure zone 117 between the susceptors 100 and 102 surrounds the composite panel.

In FIG. 4, the susceptor sheets 100 and 102 contact the dies, without leaving additional pressure zones between the outer susceptors and the dies, as we described with reference to FIG. 2. When additional pressure zones are used, these zones receive pressurized forming gas through a system of conduits fabricated in the dies as described in U.S. Pat. Nos. 4,708,008; 5,129,249; or 5,309,747 or in U.S. patent application Ser. No. 08/138,282, which we incorporate by reference. If the retort incorporates the necessary pressure zones to allow forming, the dies can be porous. Such dies do not need to carry or contain high pressure gases. They are lighter, are easier to make, and are less expensive.

Forming gas is introduced to pressure zone 118 between the two prefabricated composite panels 200, such as carbon-fiber reinforced PEEK thermoplastic sheets, through suitable pressure lines to deliver pressurized inert gas which forms the panel in its "bead" region simultaneously with bonding in the regions to the immediate left and right of pressure zone 118 and the "bead" region, as shown in FIG. 5.

Where we intend to form bonds between the panels 200 and 202, we sandwich a thermoplastic film 204 (generally ULTEM). Such a film should melt at a lower temperature than the thermoplastic in the panels 200 and 202 so that bonding can occur without delaminating the panels.

FIG. 5 shows an optional silicone rubber pressure pads 206 between the lower die and the lower susceptor sheet 102. We use these pads 206 to provide an even pressure across the entire bondline to correct for imperfections in the retort or dies that world otherwise leave isolated high spots. FIG. 5 also shows shim plates 208 between the lower susceptor sheet 102 and the panel 202 in the bondline region to provide relief in gap 10 between the lower panel 202 and the lower susceptor sheet in the "bead" zone remote from the bondlines.

While we have described that the part can be formed and bonded simultaneously, the operations can be done sequentially with forming preceding bonding. Sequential processing is simpler but slower.

We energize the coils with a time varying electrical field to produce a time varying magnetic field to heat the susceptors inductively to the bonding temperature of the composite panel. Heat is transferred by conduction and/or radiation from the susceptors into the composite panel, so it, too, reaches bonding temperature. The shims transfer heat faster to the bondline so the ULTEM film bonding agent melts before the remote "bead" regions heat to their delaminating temperature.

After completing bonding, we de-energize the induction coils and cool the retort and tool inserts to freeze the bonding agent (e.g., the adhesive, thermoplastic, or braze alloy) in the joint. Then we remove the retort from the tool inserts. Although there is some heat transfer between the retort and the tool inserts, it is insufficient to heat the tool inserts or dies significantly because the dies are such good thermal insulators. Therefore, the retort can quickly be pulled from the press. When the retort cools sufficiently, we remove the edge strips and recover the completed part. Often the edge strips and the susceptor sheets are reusable.

In one example of composite bonding in accordance with the present invention, we bonded two composite panels each comprising 48 layers of thermoplastic PEEK.IM6 prepreg ⅜ inch thick. Two aluminum sheets having a thickness of 1/16 inch were placed around the composite panel and aluminum shims were positioned in the bondline region between the lower susceptor and lower PEEK panel as shown in FIG. 5. We used a pressure pad as previously described and placed the retort in the tool inserts and inductively heated the assembly to a temperature of 550° F. in 15 minutes We maintained the retort at 550° F. for two minutes and then cooled it for 15 minutes. When we reached the bonding temperature of 550° F., we applied a constant pressure of about 100 psi within pressure zone 117 until the part was cool. These times and pressures are representative only and would differ depending upon the composite material used and the thickness and complexity of the bonded part.

The present invention is applicable to all types of organic matrix composites including both thermosetting and the thermoplastic composites such as epoxies, bismaleimides, polyimides, PEEK, PEK, PEKK, PES, or the like. If the materials have high solvent concentrations or the resins emit volatiles when they cure, we need to "bag" the workpiece to permit egress of these volatiles. Therefore, we prefer using resins with low volatiles that are true thermoplastics, like PEEK.

We can bond metals in a comparable process that we will describe in greater detail in section 4.

3. Bonding (i.e., curing Thermosetting Resin Composite Honeycomb Panels

Figure 6:
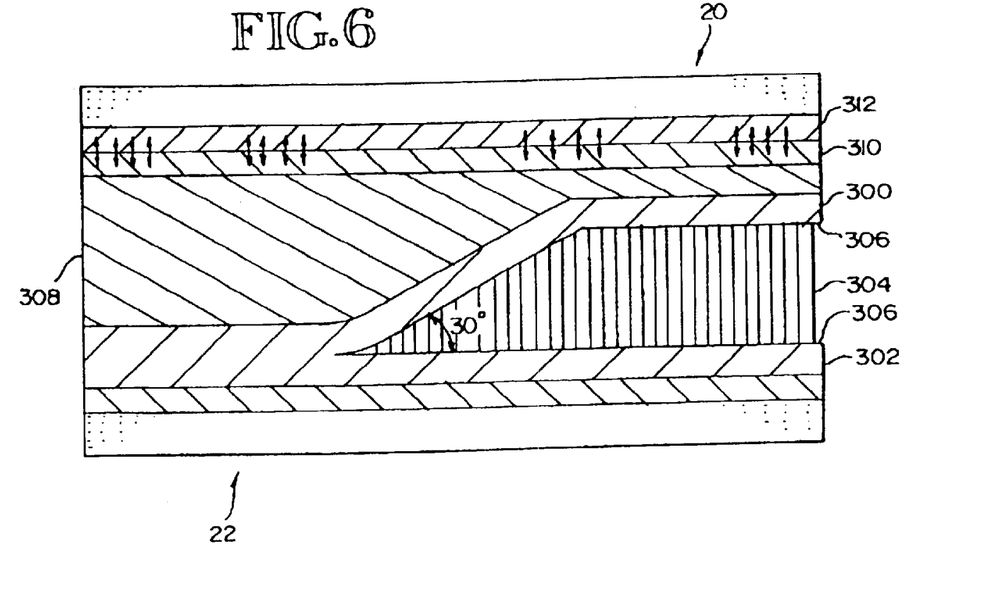
FIG. 6 is another schematic sectional view showing bonding of a honeycomb panel to thermoset skins using our induction heating workcell.

FIG. 6 illustrates the bonding of thermoset facesheets 300 and 302 to a honeycomb core 304 using an adhesive film 306 in a cobond operation. The thermoset sheets and core are contained within two "6061" aluminum alloy susceptor sheets with silicone or Shinitzu rubber overlay 308 configured to provide a lay-up of substantially constant thickness despite changes in the part configuration. FIG. 6 shows a three susceptor sheet retort with two sheets 310 and 312 defining a pressure zone in which we can inject argon gas 314 to increase the bonding pressure. Bonding pressure is transferred through the susceptor 310 to the rubber overlay 308 and into the upper thermoset sheet 300 when the temperature activates adhesive, typically around 375° F. for adhesives used with epoxy thermosets. The third susceptor sheet 316 underlies the facesheet 302. The bonding time is about 1 hour with heat-up and cool-down taking about 15 min. each for a total cycle time of 90 mins.

The surface of an aircraft wing skin must be maintained to a close tolerance to achieve an efficient aerodynamic surface. The tolerances of the inner mold line surface of the wing skin must also be maintained at a close tolerance at least in a buildup area where the wing skin will be joined to a spar to ensure that the wing skin and spar can be precisely joined. It is not critical, however, to control the inner mold line surface in areas where the wing skin is not attached to other structures. The composite panel has additional plies to define the buildup areas. The additional reinforce the composite panel in these areas which is necessary where a spar will be attached, and provide a convenient way to match the skin and spar to produce the desired outer wing configuration even if the spars are imprecise in their dimensions. We can fabricate built up areas at the faying surfaces to provide the precision fit, in which case we can eliminate shims.

4. Bonding Metals a. Brazing

For brazing metal we prefer to use copper susceptor sheets about 0.032–0.062 inches thick, stainless steel, or a cobalt alloy "smart" susceptors as described in U.S. Pat. No. 5,728,309 entitled: "Method for Achieving Thermal Uniformity in Induction Processing of Organic Matrix Composites or Metals," which we incorporate by reference. Sometimes, the part itself can be the susceptor. Copper is a good susceptor and allows higher processing temperatures than aluminum or aluminum alloys. Copper also is an excellent susceptor material because it provides excellent heat transfer. Copper's excellent heat transfer properties help to ensure improved thermal uniformity. When processing metals, especially when using a copper retort at high temperatures, we typically use an inert atmosphere within the interior pressure zones to protect the copper and the parts being produced (i.e. the workpiece) against oxidation. That is, the inert gas purge protects the workpiece (and the copper retort materials) from oxygen damage. The susceptor can be a laminate of aluminum and copper. Aluminum outer sheets efficiently convert the magnetic energy to heat. The underlying copper sheets transfer the heat well from the aluminum skin to the metal or resin workpiece.

Brazing of metals is essentially the same process as that described for the bonding of organic matrix composites, so we will not repeat it here. We substitute a braze alloy for the thermoplastic film or thermoset adhesive, and form braze joints between the metal sheets at selected locations. We can combine brazing with forming or with other operations as described in U.S. Pat. No. 5,705,294.

b. Adhesive bonding

Figure 7:
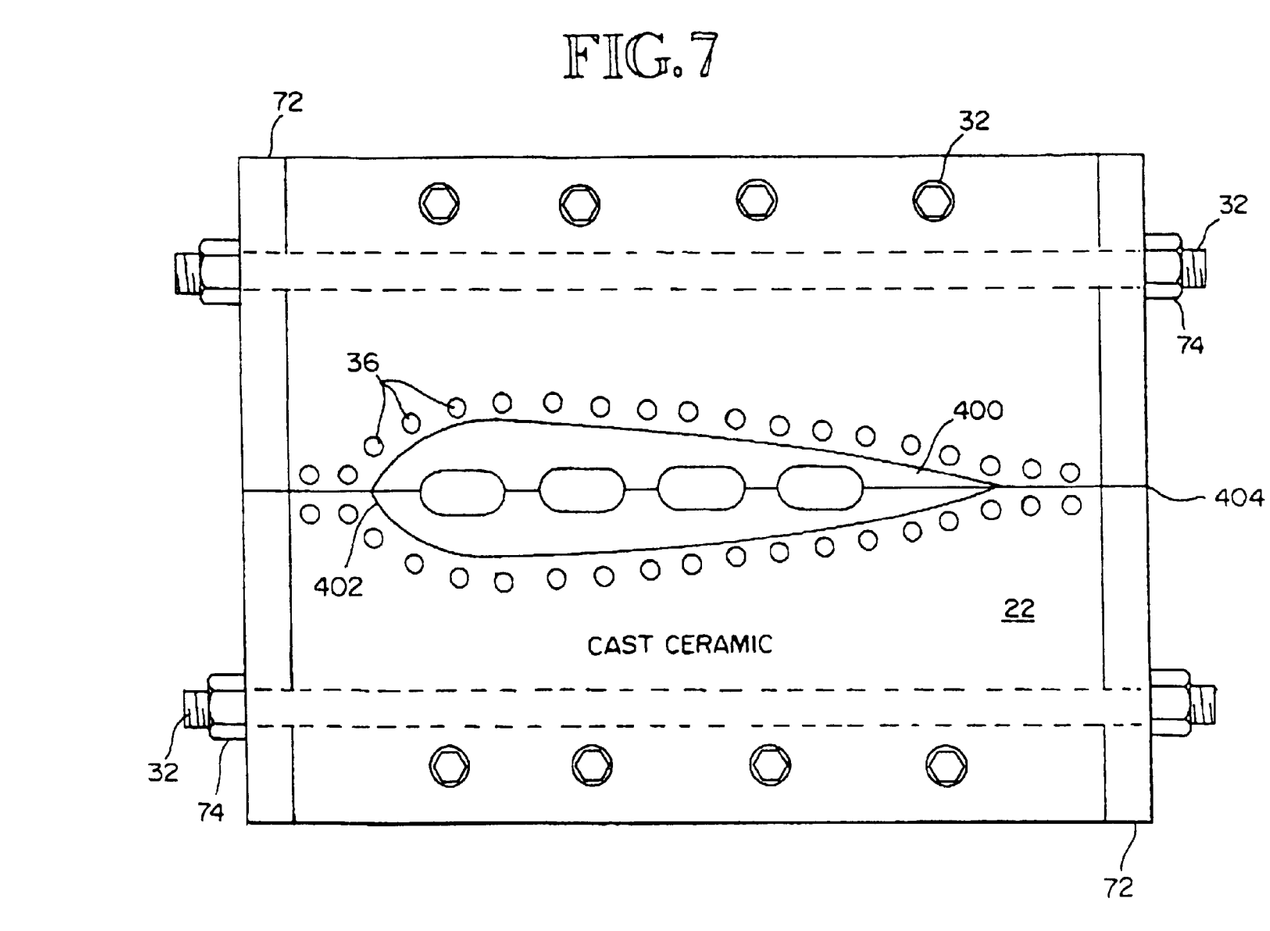
FIG. 7 is yet another schematic sectional view showing adhesive bonding of an airfoil, such as two machined halves of an aluminum missile wing.

As shown in FIG. 7, the present invention also contemplates adhering two metal parts together using a hot melt, organic matrix resin thermoplastic or thermoset adhesive. In FIG. 7, complementary machined aluminum missile fin halves 400 and 402 are bonded together with a thermoset adhesive 404 in the induction heating workcell. The adhesive is applied to the prepared surfaces that abut. In the process illustrated, we heat the parts directly with the induction coil 36 that surrounds the parts. This adhesive bonding process uses less expensive tooling than alternative processes, accomplishes the bonding in short thermal cycles, and is faster and cheaper than batch mode autoclave bonding operations. The process is just one more operation that one workcell can accomplish, thereby showing the versatility and agility of this flexible manufacturing workcell.

While we have described preferred embodiments, those skilled in the art will readily recognize alterations, variations, and modifications which might be made without departing from the inventive concept. Therefore, interpret the claims liberally with the support of the full range of equivalents known to those of ordinary skill based upon this description. The examples are given to illustrate the invention and not intended to limit it. Accordingly, limit the claims only as necessary in view of the pertinent prior art.

We claim:

1. A bonded metal or composite assembly made using induction heating, the assembly being made by the method comprising the steps of:
   (a) assembling at least two workpieces to sandwich at least one bonding material selected from the group consisting of temperature-activated adhesives, braze alloys, and bonding agents to form an assembly;
   (b) enclosing the assembly in a sealable retort including a metal susceptible to heating inductively;
   (c) placing the assembly and retort in an induction heating press;
   (d) energizing the induction heating press to heat the retort and, in turn, the bonding material until the bonding material melts;
   (e) de-energizing the induction heating press to cool the retort and, in turn, the bonding material to bond the workpieces together to form bonded workpieces;
   (f) recovering the bonded workpieces in the retort from the press;
   (g) optionally, placing shims at selected locations within the retort and the workpieces to define a bondline where the workpieces will be bonded and bead regions where the workpieces do not bond; and
   (h) optionally, forming at least one workpiece by stretching or expanding that workpiece in at least one bead region by introducing pressure into the retort, wherein the energizing step heats the retort with subsequent transfer of heat from the retort to the bonding material through the workpieces.

2. The assembly of claim 1 wherein the workpieces are thermoplastic resin matrix composites and the bonding material is a thermoplastic film.

3. The assembly of claim 1 wherein the workpieces are thermoset resin matrix composites.

4. The assembly of claim 1 wherein the workpieces are metal or metal alloys and the bonding material is a braze alloy.

5. The assembly of claim 4 wherein the bonding material is a braze alloy.

6. The assembly of claim 4 wherein the bonding material is an organic matrix resin adhesive.

7. The assembly of claim 4 being an airfoil.

8. A bonded metal or composite assembly made using induction heating, the assembly being made by the method comprising the steps of:
   (a) assembling at least two workpieces to sandwich at least one bonding material selected from the group consisting of temperature-activated adhesives, braze alloys, and bonding agents to form an assembly;
   (b) placing shims at selected locations to define a bondline where the workpieces will be bonded and bead regions where the workpieces do not bond;
   (c) following step (b), enclosing the assembly in a sealable retort including a metal susceptible to heating inductively;
   (d) placing the assembly and retort in an induction heating press;
   (e) energizing the induction heating press to heat the retort and, in turn, the bonding material until the bonding material melts;
   (f) forming at least one workpiece by stretching or expanding that workpiece in at least one bead region by introducing pressure into the retort;
   (g) de-energizing the induction heating press to cool the retort and, in turn, the bonding material to bond the workpieces together to form bonded workpieces; and
   (h) recovering the bonded workpieces in the retort from the press;

wherein the energizing step heats the retort with subsequent transfer of heat from the retort to the bonding material through the workpieces.

9. The assembly of claim 8 wherein the workpieces are metal or metal alloys and the bonding material is a braze alloy.

* * * * *